Jan. 24, 1967   W. A. BERTOLINI ETAL   3,300,228
APPARATUS FOR SELECTIVELY POSITIONING VEHICLE SUSPENSION
Filed Dec. 24, 1964   4 Sheets-Sheet 1
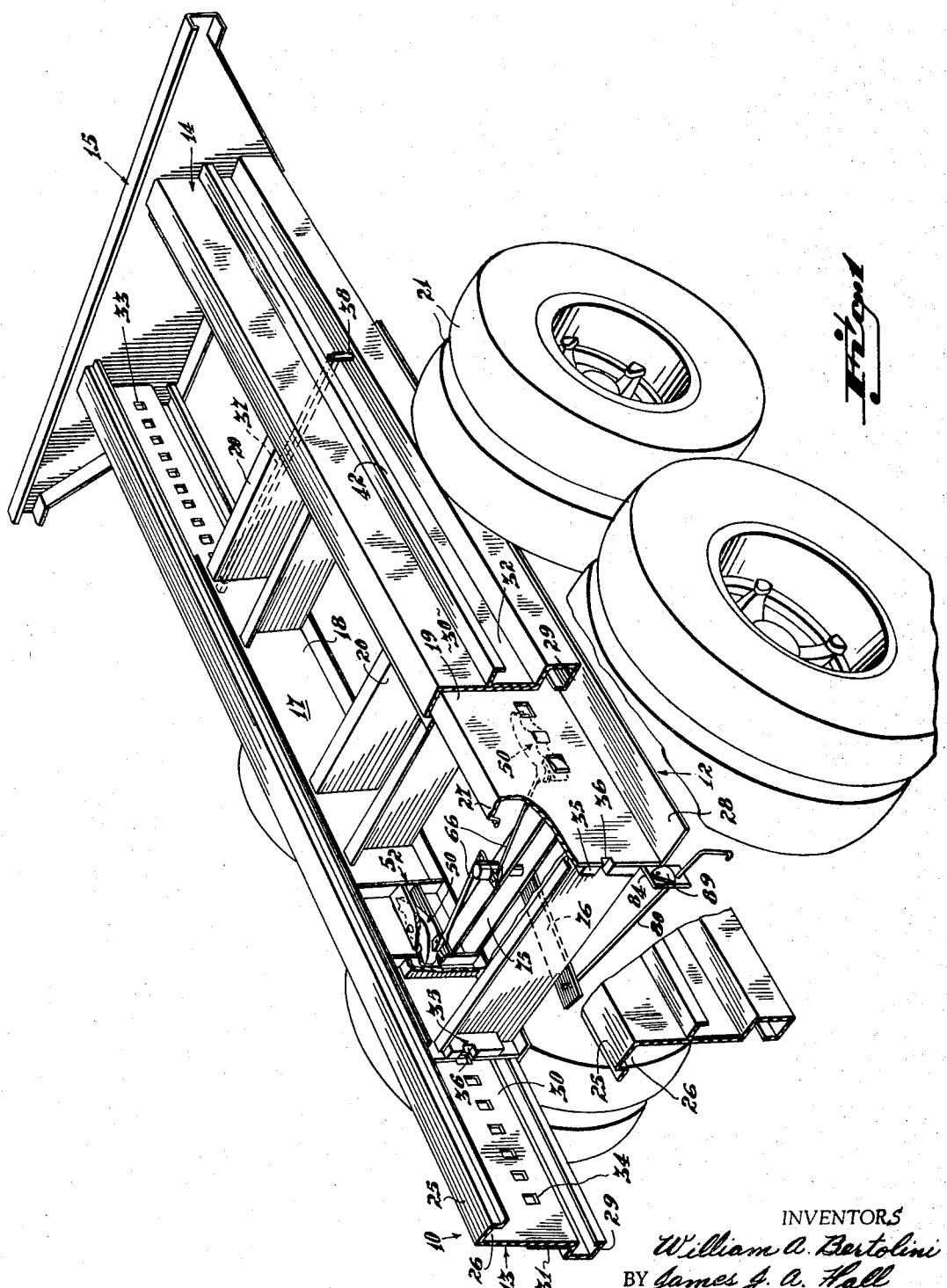
INVENTORS
William A. Bertolini
BY James J. A. Hall
Wood, Herron & Evans
ATTORNEYS

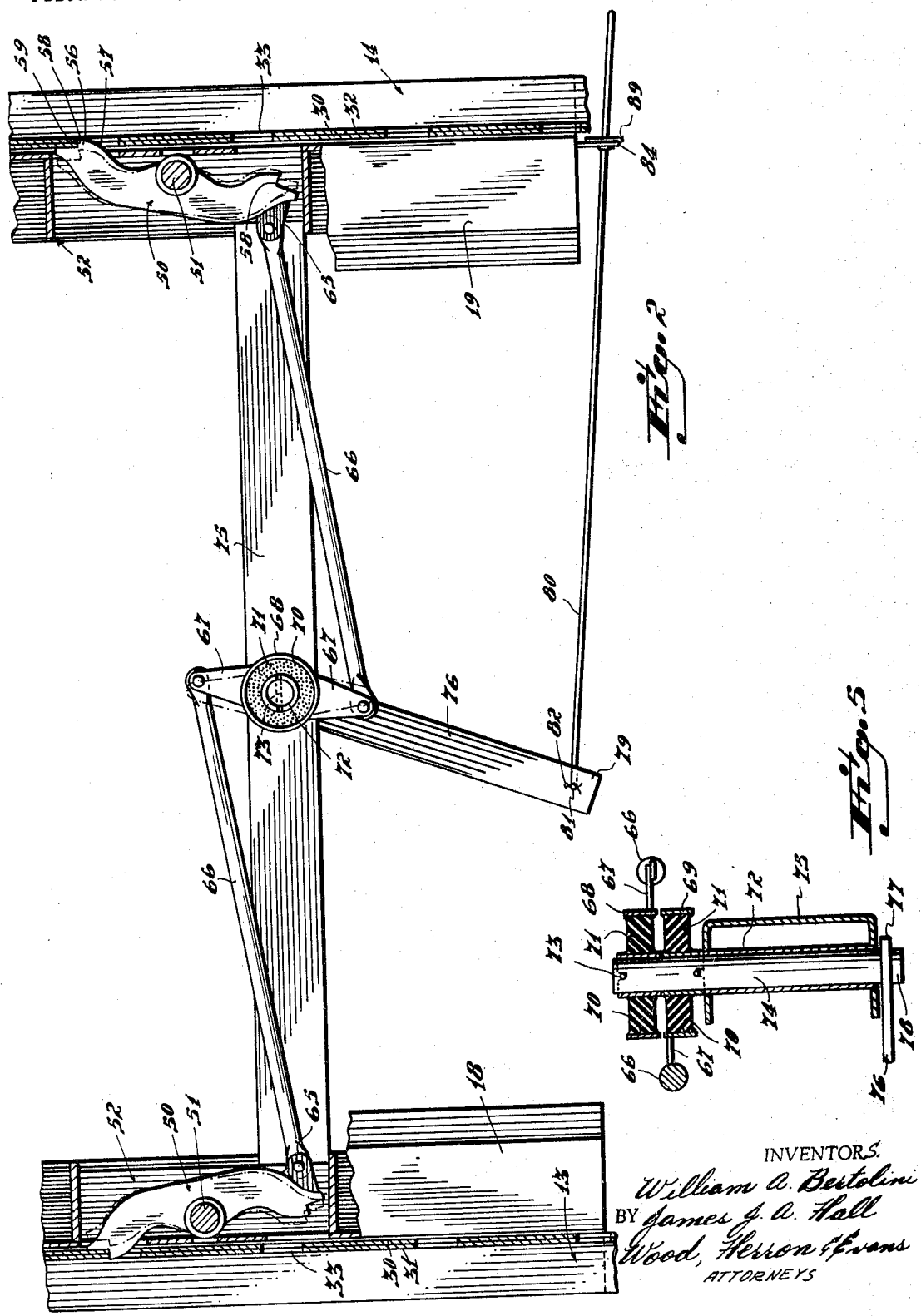

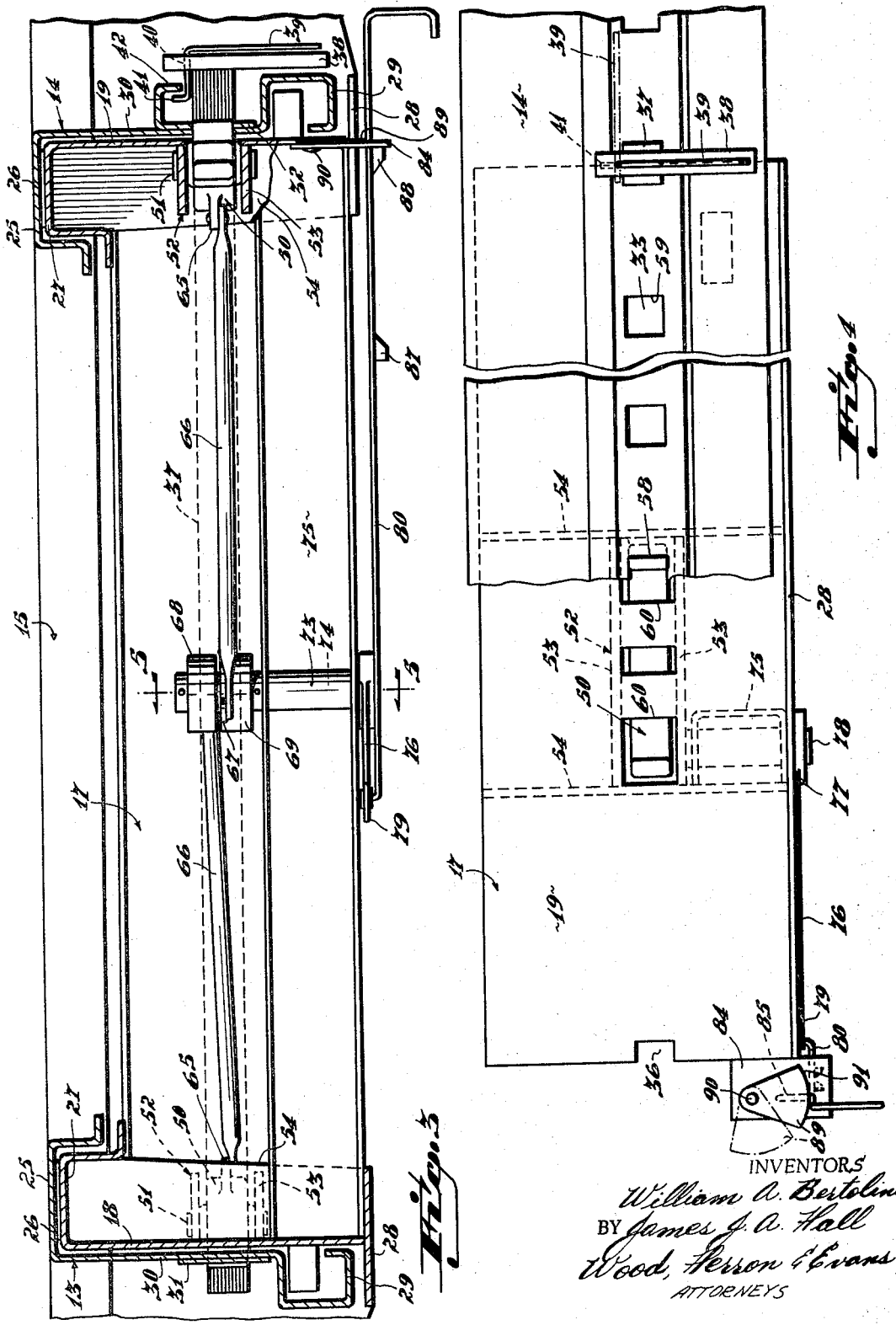

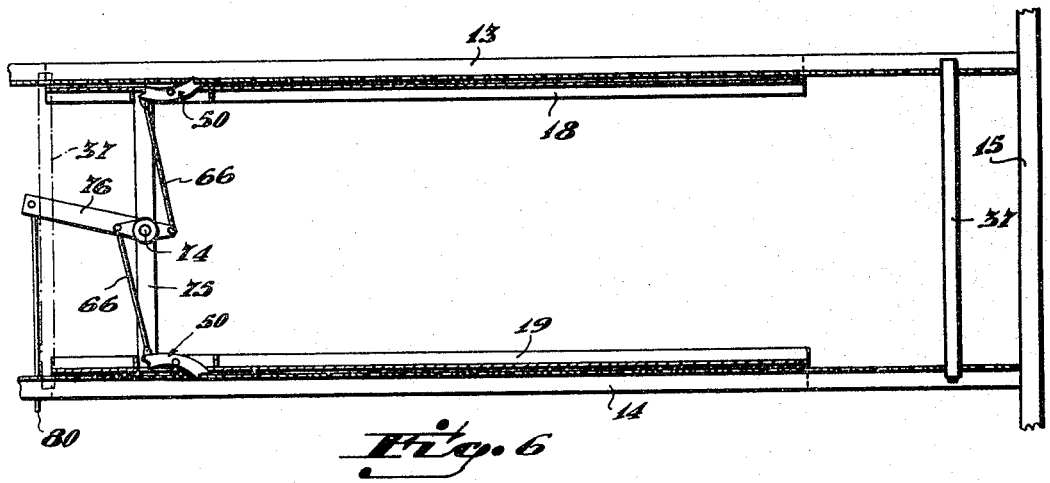
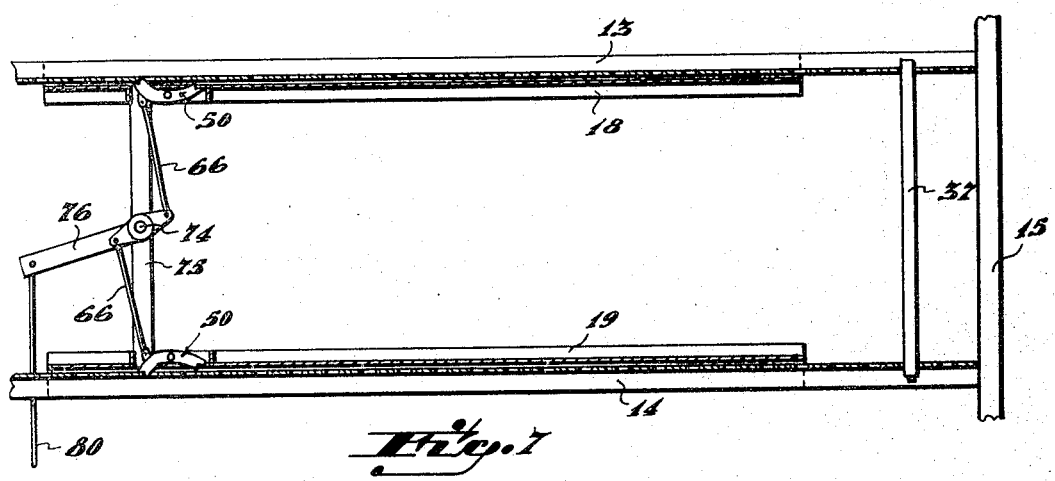
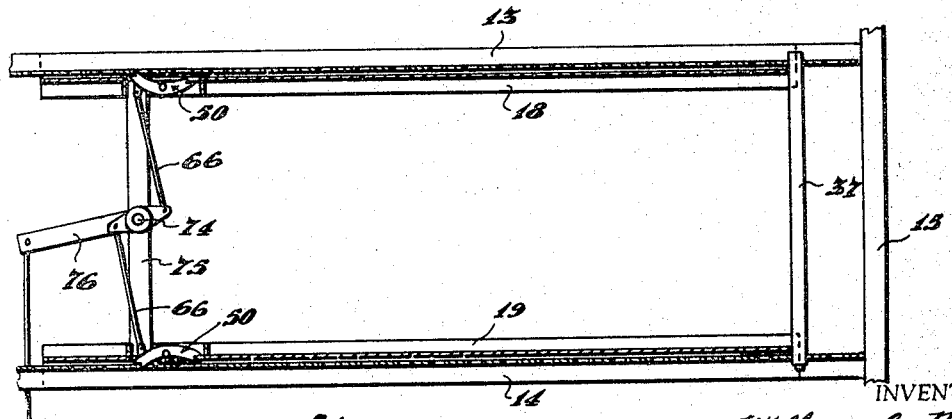

United States Patent Office 3,300,228
Patented Jan. 24, 1967

3,300,228
APPARATUS FOR SELECTIVELY POSITIONING
VEHICLE SUSPENSION
William A. Bertolini and James J. A. Hall, Cincinnati,
Ohio, assignors to Pullman Incorporated, Chicago, Ill.,
a corporation of Delaware
Filed Dec. 24, 1964, Ser. No. 421,023
8 Claims. (Cl. 280—81)

This invention relates to shiftable vehicles suspensions and more particularly, the invention is directed to a suspension which is slidably mounted with respect to the chassis of a semi-trailer and which is automatically locked into a preselected position after the position is attained.

The need to vary the longitudinal position of a suspension with respect to a trailer arises from two aspects of the operation of cargo transporting vehicles. First, there is the need to maintain the loading on the forward and rearward suspensions substantially equal so that neither is unusually stressed. The potential inequality of axle loading arises from a non-uniform distribution of the cargo in the trailer. Second, among the several states there are laws respecting the distribution of the load on the forward and rearward axles and these laws must be observed if the trailer is to be permitted to be hauled over the highways of the particular state involved. One state may, for example, require the rear axles to be loaded proportionally greater than another state. It is, therefore, not unusual for a trailer whose loading is in compliance with the laws of one state to have a loading which is in violation of the laws of the adjoining state. It is necessary in such cases to pull the vehicle into a weighing station after a state line has been crossed to have the load distribution checked and to make a shift of the longitudinal position of the trailer suspension to comply with the state law. Also, some states regulate the vehicle gross weight according to the distance between the first and last axle, the greater the distance, the greater the allowable load. Therefore, a trailer suspension located as far back as possible is desirable.

The structure of the trailer which permits the changes in the axles load distribution includes a chassis having elongated rails and a suspension having a frame which is slidably mounted with respect to the chassis rails. The chassis rails have aligned holes adapted to receive transverse rods which extend across the chassis at each end of the suspension frame and prevent its relative movement with respect to the chassis rails.

To shift the position of the suspension with respect to the chassis it has been the practice to lock the brakes of the suspension, shift one of the transverse rods to the new required position, drive the trailer either rearwardly or forwardly to bring the transverse rod back into engagement with the frame, the suspension and frame remaining in a fixed position due to the locking of the brakes. After the desired relative position of the frame and chassis has been obtained, the remaining transverse rod is repositioned at the opposite end of the frame thereby fixing the longitudinal position of the frame. The operation described above is annoying as well as time consuming for it requires the driver to get in and out of his cab several times to change the position of the rods and to shift the trailer chassis.

It has been an objective of the invention to provide a selective locking mechanism for a trailer suspension which requires the driver to get out of his cab only once to perform easily and quickly certain operations required to effect automatic locking of the suspension in a desired longitudinal position.

There have been a number of proposals for automatic locking mechanisms, these proposals having been made in an effort to minimize the number of operations which the vehicle driver must perform in order to effect the longitudinal shifting of the suspension. For the most part, these proposals have involved spring loaded pins adapted to be thrust through aligned holes in the chassis and suspension frame respectively, a cocking mechanism to hold the pins in a withdrawn position and selectively positionable means for tripping the cocking mechanism to release the pins when the trailer has been advanced to that position in which the pre-selected holes are aligned. The prior proposals have necessarily required a certain complexity of structure in the operating mechanism in order to effect the cocking and properly timed release of the locking pins. Further, the prior proposals admit of the possibility of a failure to engage the aligned holes or only a partial engagement of the aligned holes in view of the fact that the release of the locking pins is made while the vehicle is moving so that there is relative movement between the two holes which are to be aligned to permit the locking passage of the pins through them.

It has been another objective of the invention to provide an automatic and selective locking mechanism for positioning the trailer suspension with respect to its chassis, the locking mechanism having a simplified structure and providing complete reliability of operation.

Still another objective of the invention was to provide an automatic locking device including at least one pawl on a suspension frame which is engageable with an abutment on the vehicle chassis, the engagement of the pawl with the abutment being made when the relative movement of the chassis and frame is stopped. To this end, the invention contemplates the provision of a bi-direction ratchet pawl which selectively locks in one direction while permitting movement in the opposite direction, the pawl being selectively positionable for a locking function in either the forward or rearward direction. The pawl is used in conjunction with the commonly used transverse positioning rod which blocks relative movement of chassis and suspension frame in one direction while the pawl blocks relative movement in the opposite direction.

The operation of the device according to the invention is quite simple and requires the driver only to position the transverse rod in the desired location on the chassis and to orient the locking pawls so that they perform the movement blocking function in a direction opposite to that performed by the transverse rod. These adjustments having been made, the operator drives his trailer in a forward or rearward direction with the suspension locked against movement until the transverse bar on the chassis is moved into engagement with the suspension frame. At that point, and with the relative movement of the chassis and frame stopped, the pawl drops into an aperture in the chassis to lock the chassis against movement with respect to said frame in a direction opposite to that blocked by the transverse rod.

The several objectives of the invention will become more readily apparent from the following detailed description taken in conjunction with the accompanying drawings in which:

FIG. 1 is a fragmentary perspective view of a chassis and suspension provided with a locking mechanism according to the present invention, FIG. 2 is a fragmentary top plan view partly in section of the locking mechanism, FIG. 3 is an end elevational view partly in section of the automatic locking mechanism, FIG. 4 is a fragmentary side elevational view with portions of the chassis broken away, FIG. 5 is a cross sectional view taken along lines 5—5 of FIG. 3, and FIGS. 6, 7 and 8 are diagrammatic plan views partly in section illustrating the operation of the invention.

The rear portion of a trailer chassis 10 and suspension 12 is shown in FIG. 1. The chassis includes two longitudinally extending rails 13 and 14 which are parallel and transversely spaced from each other. The rails are interconnected by suitable cross-bolsters which have been omitted from the drawings for the sake of clarity, an end cross-bolster 15 being shown.

The suspension 12 comprises a sliding frame 17 having longitudinal members 18 and 19 which are interconnected by cross members 20, the frame having wheels 21 mounted to it by means of axles and springs, not shown.

The sliding frame 17 is slidable with respect to the chassis rails 13 and 14 in order to vary the distribution of the load between the rear and forward axle groups of the vehicle. The chassis rails 13 and 14 are configurated as irregular beams, each having an upper flange 25 presenting a downwardly directed channel 26. Correspondingly, the longitudinal members 18 and 19 of the frame are shaped as irregular beams whose top flanges 27 present upper surfaces mating with the configuration of the channel 26. The members 18 and 19 have lower flanges 28 which ride under lower flanges 29 of the chassis rails 13 and 14.

Each chassis rail 13 and 14 has a vertical web 30 to which reinforcing plates 31 and 32 respectively are welded. Each chassis rail has a plurality of longitudinally spaced holes 33 passing through the web 30 and plate 31 or 32, the holes extending from the rearward end of the chassis rails, the forwardmost aperture being shown at 34 which is the location of the forward extremity of the suspension sliding frame 17 when it is in its forwardmost position with respect to the chassis rails. The holes 33 on the respective rails are transversely aligned as pairs which receive a transverse rod as described below.

The forward and rearward ends of the longitudinal frame members 18 and 19 are strengthened by blocks 35, the blocks and end edges being notched as at 36. Each notch 36 is adapted to be precisely aligned with one of the holes 33 when the frame 17 is in any one of its selected locked positions with respect to the chassis rails. When in that selected position, the aligned holes and notches are adapted to receive a transverse locking rod 37 which blocks movement of the frame with respect to the chassis in one direction. As shown in FIG. 3, the rod 37, when once positioned in selected holes 33, is blocked from transverse movement which would dislodge it inadvertently, the rod being blocked by a handle 38 and a latch 39 mounted at one end of the rod. The latch 39 is pivoted in a hole 40 in the top portion of the handle and has a normally upwardly projecting lug 41 which is swingable under a lip 42 forming a part of the reinforcing plate 32. The latch 39 can be swung to a horizontal position which drops the lug 41 below the extremity of the lip 42 so that the rod can be withdrawn. Movement of the rod in a leftward direction is obviously blocked by the engagement of the handle 38 with the lower flange 29 of the chassis rail 14. Thus, forward movement of the chassis with respect to the suspension frame is blocked when the rod 37 is in the rearward position illustrated in FIG. 1. The rearward movement of the chassis with respect to the suspension frame can also be blocked by repositioning the rod 37 at the forward end of the frame 17.

When the rod 37 is in one of its blocking positions, movement of the chassis with respect to the suspension frame is blocked in the opposite direction by ratchet pawls 50, one ratchet pawl being mounted on each side of the frame and being engageable with the apertures 33 in a respective rail 13 or 14. Each pawl is mounted on a pivot pin 51 which is fixed in a bridge 52 constituted by horizontal plates 53 mounted betwen vertical plates 54, the bridge being welded between the upper flange 27 and lower flange 28 of each longitudinal member 18 and 19 of the suspension frame 17.

Referring to FIG. 2, each pawl 50 is elongated and has a lock dog 56 at each end. Each lock dog has a sloping surface 57 and a transverse face 58. The transverse face is engageable with vertical edges 59 in the holes 33 of the chassis rails 13 and 14. These edges 59 provide abutments which, when engaged by the transverse faces 58 of the lock dogs, block movement of the lock dogs, and consequently the suspension frame 17. The longitudinal members 18 and 19 of the frame 17 have holes 60 which are alignable with holes 33 to permit the dogs 56 to project through the longitudinal members and drop into the aperture 33.

The sloping surface 57 of the lock dog permits the lock dog to ride out of each hole 33 when the frame is moved in the opposite direction. This movement is, of course, normally blocked by the rod 37, but in making the shift of position of the frame, the ability of the lock dog to permit movement of the frame in one direction is utilized as will appear below.

Each pawl has an ear 65 to which one end of a control rod or link 66 is pivotally attached. The other end of each link 66 is pivotally connected to a lug or arm 67, each arm being fixed respectively to an upper ring 68 or a lower ring 69. (See FIG. 5.)

Each ring 68 and 69 is fixed to the circumferential surface 70 of a respective rubber bushing 71 fixed at its center to a sleeve 72 which is in turn fixed by pins 73 to a trunnion shaft 74. The sleeve 72 is mounted in a trunnion support 75 which is a channel shaped cross member extending between the longitudinal frame members 18 and 19.

A cocking lever 76 is fixed at one end 77 to the lower end 78 of trunnion shaft 74. The other end 79 of the cocking lever 76 is pivotally connected to an actuating rod 80, the actuating rod 80 having an upwardly projecting lug 81 which is secured by a cotter pin 82 in a hole in the end 78 of the cocking lever. The actuating rod is slidable in a hole passing through a plate 84 which is welded to the longitudinal frame member 19. As shown in FIG. 3, the rod has two handle stops 87 and 88 which are engageable with the outer and inner surfaces of the plate 84, respectively to fix the position of the rod. As shown in FIG. 4, the plate has an L-shaped slot 85 which has a sufficient vertical dimension to permit the stops 87 and 88 to pass through it. A handle interlock 89 is pivoted at 90 on the plate 84 and has a locking surface 91 which is engageable with the upper surface of the rod 80 to prevent its movement into the upper portion of the slot 85. Thus, when the interlock is in the position shown in full lines in FIG. 4, the rod is blocked from movement into the upper portion of the slot 85 and the handle stops 87 and 88 are therefore blocked from passage through the slot 85. However, the passage of the handle stops through the slot 85 is permitted when the interlock 89 is swung up out of the way as indicated by the broken line position in FIG. 4.

When the actuating rod 80 is pushed inwardly, as shown in FIGS. 1 to 5, the trunnion shaft is rotated clockwise, as viewed in FIG. 2, and acts through the rubber bushings 71 to pivot the arms 67 clockwise, thereby pivoting the pawls 50 into a position in which their rearward lock dogs 56 move into engagement with the chassis rails 13 or 14 or into the apertures 33 thereof. The distance which the actuating rod must move inwardly to bring the outer handle stop 88 to its position of engagement with the interface of the plate 84, is greater than the distance required in order to swing the pawls 50 into the operative position shown in FIG. 2. The additional movement is taken up by the stressing of the rubber bushings 71 which thereby act as springs to hold the pawls 50 tightly in their operative position. The bushings 71 are not stressed to their full extent so that the dogs 56 can move out of the apertures 33 at least to the extent shown in the broken line position of the pawl in FIG. 2.

Similarly, when the actuating rod is pulled to the extreme position in which the handle stop 87 engages the outer face of the plate 84, the bushings 71 are stressed in the opposite direction and the pawls 50 are swung to the opposite position to that illustrated in FIG. 2 and are held in that position by the spring action of the resilient rubber bushings 71.

The operation of the invention is illustrated in FIGS. 6 to 8. To begin the operation, it is assumed that the frame 17 is in the position of FIG. 6 and that it is desired to shift it in a rearward direction with respect to the chassis. In the first step in the operation, the driver sets his brakes on the wheels of the suspension supported by the frame 17 and then removes the rod 37 from its broken line position of FIG. 6 and repositions it at the full line position in FIG. 6. The full line position represents the position in which the rearward end of the frame 17 is to be located when the frame 17 is correctly positioned.

The actuating rod 80 is withdrawn thereby pulling the cocking lever 76 in a counter clockwise direction which shifts the pawls 50 from the position of FIG. 6 to the position of FIG. 8, the pawls being urged into the position of FIG. 8 by the stressing of the rubber bushings 71. The driver then gets into his cab, and with the rear wheel brakes still locked, pulls the chassis in a forward direction to bring the rod 37 into engagement with the rear edge of the frame 17. As the chassis moves with respect to the pawls 50, the sloping surface 57 of each lock dog 56 permits the pawl to ride in and out of the apertures 33 in the chassis rails 13 and 14.

When the rod 37 engages the rearward edge of the frame 17, further relative movement of the chassis with respect to the frame is blocked. The relationship of the spacing of the holes 33 in the guide rails is such that the lock dog 56 drops into a hole 33 bringing its transverse face 58 into engagement with the abutment 59 formed by a vertical edge of the hole 33 into which it drops. The engagement of the transverse face 58 with the edge of the hole 33 blocks movement of the chassis with respect to the frame in a rearward direction so that the vehicle can be backed without having the suspension frame slide with respect to the chassis. In other words, the frame is blocked against movement with respect to the chassis by the rod 37 in one direction and by the pawls 50 in the other direction. The driver has only to release his brakes and the operation is completed.

We claim:

1. Roadway vehicle apparatus comprising,
   a chassis including a pair of laterally spaced longitudinally extending rails, said rails having longitudinally spaced transversely aligned holes,
   a suspension including a frame slidably mounted on said rails, springs on said frame, at least one axle mounted on said springs and wheels mounted on said axles,
   a pawl pivoted at each side of said frame,
   each said pawl having a lock dog on each side of its pivot axis and selectively engageable with holes in said rail,
   each said dog having a sloped face and a transverse face permitting said dog respectively to ride out of or lock into a hole as said frame is urged in a longitudinal direction with respect to said rails,
   and spring means selectively biasing one of said dogs toward said holes.

2. Roadway vehicle apparatus comprising,
   a chassis including a pair of laterally spaced longitudinally extending rails, said rails having longitudinally spaced transversely aligned holes,
   a suspension including a frame slidably mounted on said rails, springs on said frame, at least one axle mounted on said springs and wheels mounted on said axles,
   said frame including two longitudinal members extending adjacent respective rails,
   said longitudinal members having holes alignable with the holes in said rails,
   a pawl pivoted at each side of said frame,
   each said pawl having a lock dog on each side of its pivot axis and selectively engageable with aligned holes in said frame and rail,
   each said dog having a sloped face and a transverse face permitting said dog respectively to ride out of or lock into a hole as said frame is urged in a longitudinal direction with respect to said rails,
   and spring means selectively biasing one of said dogs toward said holes.

3. Roadway vehicle apparatus comprising,
   a chassis including a pair of laterally spaced longitudinally extending rails, said rails having longitudinally spaced transversely aligned holes,
   a suspension including a frame slidably mounted on said rails, springs on said frame, at least one axle mounted on said springs and wheels mounted on said axles,
   a pawl pivoted at each side of said frame,
   each said pawl having a lock dog on each side of its pivot axis and selectively engageable with said holes in said rail,
   each said dog having a sloped face and a transverse face permitting said dog respectively to ride out of or lock into a hole as said frame is urged in a longitudinal direction with respect to said rails,
   a shaft rotatably mounted at the center of said frame,
   a pair of resilient bushings mounted on said shaft,
   arms projecting from said bushings,
   a link connecting each arm to a respective pawl at one side of said pivot axis,
   and means for selectively rotating said shaft in either direction.

4. Roadway vehicle apparatus comprising,
   a chassis including a pair of laterally spaced longitudinally extending rails, said rails having longitudinally spaced transversely aligned holes,
   a suspension including a frame slidably mounted on said rails, springs on said frame, at least one axle mounted on said springs and wheels mounted on said axles,
   a pawl pivoted at each side of said frame,
   each said pawl having a lock dog on each side of its pivot axis and selectively engageable with said holes in said rail,
   each said dog having a sloped face and a transverse face permitting said dog respectively to ride out of or lock into a hole as said frame is urged in a longitudinal direction with respect to said rails,
   spring means selectively biasing one of said dogs toward said holes,
   and a transverse rod selectively positionable in aligned holes in each side of said chassis for locking said chassis against movement in a direction permitted by said pawls.

5. Roadway vehicle apparatus comprising,
   an elongated chassis,
   a frame longitudinally slidable on said chassis,
   a plurality of longitudinally spaced abutments on said chassis,
   at least one bi-directional pawl mounted on said frame for selective movement to one of two positions of engagement with said abutments,
   said pawl, when in a first position, having means on the pawl cooperating with said abutments to permit said chassis to move forward with respect to said frame and to block rearward movement of said chassis with respect to said frame,
   said pawl, when in a second position, having further means on the pawl cooperating with said abutments to permit said chassis to move rearwardly with respect to said frame and to block forward movement of said chassis with respect to said frame,
   and means connecting with said pawl to move the pawl to either the first position or the second position,
   and releasable means in cooperative engagement with said chassis and frame for locking said chassis against movement in the direction permitted by said pawl.

6. Roadway vehicle apparatus comprising,
   an elongated chassis, a frame longitudinally slidable on said chassis,
a plurality of longitudinally spaced abutments on said chassis, and
at least one bi-directional pawl mounted on said frame for selective movement to one of two positions of engagement with said abutments,
said pawl, when in a first position, having means on the pawl cooperating with said abutments to permit said chassis to move forward with respect to said frame and to block rearward movement of said chassis with respect to said frame,
said pawl, when in a second position, having further means on the pawl cooperating with said abutments to permit said chassis to move rearwardly with respect to said frame and to block forward movement of said chassis with respect to said frame,
and means connecting with said pawl to move the pawl to either the first position or the second position.

7. Roadway vehicle apparatus comprising,
an elongated chassis,
a frame longitudinally slidable on said chassis,
a plurality of longitudinally spaced holes in each side of said chassis,
at least one bi-directional pawl mounted on said frame for selective movement to one of two positions of engagement in said holes,
said pawl, when in a first position, having means on the pawl cooperating with said holes to permit said chassis to move forward with respect to said frame and to block rearward movement of said chassis with respect to said frame,
said pawl, when in a second position, having further means on the pawl cooperating with said holes to permit said chassis to move rearwardly with respect to said frame and to block forward movement of said chassis with respect to said frame,
and means connecting with said pawl to move the pawl to either the first position or the second position,
and a transverse rod selectively positionable in aligned holes in each side of said chassis for locking said chassis against movement in the direction permitted by said pawl.

8. Roadway vehicle apparatus comprising,
an elongated chassis,
a frame longitudinally slidable on said chassis,
a plurality of longitudinally spaced abutments on said chassis,
at least one bi-directional pawl mounted on said frame for selective movement to one of two positions of engagement with said abutments,
said pawl, when in a first position, having means on the pawl cooperating with said abutments to permit said chassis to move forward with respect to said frame and to block rearward movement of said chassis with respect to said frame,
said pawl, when in a second position, having further means on the pawl cooperating with said abutments to permit said chassis to move rearwardly with respect to said frame and to block forward movement of said chassis with respect to said frame,
and means connecting with said pawl to move the pawl to either the first position or the second position,
resilient means for urging said pawls into engagement with said abutments,
and releasable means in cooperative engagement with said chassis and frame for locking said chassis against movement in the direction permitted by said pawl.

References Cited by the Examiner
UNITED STATES PATENTS

| 2,900,194 | 8/1959 | De Lay | 280—80 |
| 3,102,738 | 9/1959 | De Roshia | 280—80 |

BENJAMIN HERSH, *Primary Examiner.*

P. GOODMAN, *Assistant Examiner.*